US010677324B2

(12) United States Patent
Okamoto

(10) Patent No.: US 10,677,324 B2
(45) Date of Patent: Jun. 9, 2020

(54) VARIABLE SPEED ACCELERATOR

(71) Applicant: MITSUBISHI HEAVY INDUSTRIES COMPRESSOR CORPORATION, Tokyo (JP)

(72) Inventor: Yoshiyuki Okamoto, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 41 days.

(21) Appl. No.: 16/078,841

(22) PCT Filed: Feb. 26, 2016

(86) PCT No.: PCT/JP2016/055859
§ 371 (c)(1),
(2) Date: Aug. 22, 2018

(87) PCT Pub. No.: WO2017/145367
PCT Pub. Date: Aug. 31, 2017

(65) Prior Publication Data
US 2019/0048978 A1 Feb. 14, 2019

(51) Int. Cl.
*F16H 3/72* (2006.01)
*F16H 61/02* (2006.01)
(Continued)

(52) U.S. Cl.
CPC ............... *F16H 3/72* (2013.01); *F16H 3/724* (2013.01); *F16H 61/02* (2013.01); *H02K 7/116* (2013.01);
(Continued)

(58) Field of Classification Search
None
See application file for complete search history.

(56) References Cited

U.S. PATENT DOCUMENTS 4,514,991 A * 5/1985 Zinsmeyer ............... F16H 3/72
475/2
6,358,172 B1 * 3/2002 Hiegemann ............... F16H 3/72
475/329
(Continued)

FOREIGN PATENT DOCUMENTS

JP S60-087698 A 5/1985
JP S61-214783 A 9/1986
(Continued)

OTHER PUBLICATIONS

International Search Report issued in corresponding International Application No. PCT/JP2016/055859, dated May 24, 2016, with translation (2 pages).
(Continued)

Primary Examiner — Dirk Wright
(74) Attorney, Agent, or Firm — Osha Liang LLP

(57) ABSTRACT

The present invention provides a variable speed accelerator including: a constant-speed motor (51) having a constant-speed rotor (52) which is configured to rotate a constant-speed input shaft (Ac) of a transmission device (10) in a first direction; and a variable-speed motor (71) which has a variable-speed rotor (72) connected to a variable-speed input shaft (Av) of the transmission device (10), having a cylindrical shape centered on an axis with a shaft insertion hole (74) passing therethrough in the axial direction through which the constant-speed input shaft (Ac) inserted, and configured to rotate an output shaft (Ao) at a maximum rotation rate by rotating the variable-speed rotor (72) at a maximum rotation rate in a second direction opposite to the first direction, wherein the variable speed accelerator further includes an AC power source line (110) which connects the variable-speed motor (71) with an AC power source to allow the variable-speed motor (71) to rotate in the second direction; a rotation rate controller (100) which is provided on the
(Continued)

AC power source line (110) to control a rotation rate of the variable-speed motor (71); a first switch (SW1) provided on the AC power source line (110); and a braking circuit (2) connected to portions locating between the variable-speed motor (71) and the rotation rate controller (100) with the first switch (SW1) on the AC power source line (110).

2 Claims, 6 Drawing Sheets

(51) Int. Cl.
    *H02P 5/46*     (2006.01)
    *H02K 7/116*     (2006.01)
    *H02P 3/24*     (2006.01)

(52) U.S. Cl.
    CPC ................ *H02P 3/24* (2013.01); *H02P 5/46* (2013.01); *F16H 2200/2005* (2013.01); *F16H 2200/2007* (2013.01)

(56) References Cited

U.S. PATENT DOCUMENTS

| | | | |
|---|---|---|---|
| 10,177,692 B2* | 1/2019 | Kobayashi | H02K 7/003 |
| 10,415,675 B2* | 9/2019 | Erjavec | F16H 61/66 |
| 10,454,394 B2* | 10/2019 | Okamoto | H02K 7/116 |
| 10,465,774 B2* | 11/2019 | Okamoto | F16H 3/72 |
| 2005/0113201 A1 | 5/2005 | Kimura et al. | |
| 2017/0155345 A1* | 6/2017 | Kobayashi | H02P 6/04 |
| 2018/0187778 A1* | 7/2018 | Okamoto | F16H 3/724 |
| 2018/0252300 A1* | 9/2018 | Okamoto | F16H 61/0246 |
| 2019/0048979 A1* | 2/2019 | Okamoto | F16H 3/724 |
| 2019/0068090 A1* | 2/2019 | Okamoto | F04D 25/028 |
| 2019/0093742 A1* | 3/2019 | Okamoto | F16D 41/185 |
| 2019/0113111 A1* | 4/2019 | Okamoto | H02K 9/06 |
| 2019/0170221 A1* | 6/2019 | Okamoto | F16H 3/725 |
| 2019/0181779 A1* | 6/2019 | Okamoto | F16H 3/72 |
| 2019/0186600 A1* | 6/2019 | Miyata | F16H 3/72 |
| 2019/0226557 A1* | 7/2019 | Okamoto | F16H 3/72 |

FOREIGN PATENT DOCUMENTS

| | | |
|---|---|---|
| JP | S63-117680 A | 5/1988 |
| JP | 4472350 B2 | 6/2010 |
| WO | 03/071160 A1 | 8/2003 |

OTHER PUBLICATIONS

Written Opinion of the International Searching Authority issued in corresponding International Application No. PCT/JP2016/055859, dated May 24, 2016, with translation (8 pages).

* cited by examiner

AXIAL DIRECTION
INPUT SIDE ←→ OUTPUT SIDE

VARIABLE SPEED ACCELERATOR

TECHNICAL FIELD

The present invention relates to a variable speed accelerator which includes an electric driving device including a constant-speed motor and a variable-speed motor, and a planetary gear transmission device configured to change the speed of a rotational driving force generated by the electric driving device and then transmitting the speed-changed rotational driving force to a driving target.

BACKGROUND OF THE INVENTION

As an apparatus for driving a rotary machine such as a compressor, there is an apparatus including an electric driving device for generating a rotational driving force and a transmission device for changing the speed of a rotational driving force generated by the electric driving device and then transmitting the speed-changed rotational driving force to the rotary machine.

Patent Document 1 discloses that a constant-speed motor and a variable-speed motor for speed change are used as the electric driving device and a planetary gear transmission device is used as the transmission device to accurately control a gear ratio. In this apparatus, it is possible to change a rotation rate of an output shaft of the transmission device connected to the rotary machine by changing a rotation rate of the variable-speed motor. The rotation rate of the variable-speed motor can be changed by changing a frequency of an AC power source using an inverter.

DOCUMENTS OF RELATED ART

Patent Documents

Patent Document 1: Japanese Patent Publication No. 4472350

SUMMARY OF THE INVENTION

Problems to be Solved by the Invention

In the above-mentioned apparatus, when an inverter breaks down, the rotation rate of the constant-speed motor and the rotary machine to be driven is spontaneously reduced. On the other hand, the rotation rate of the variable-speed motor may be determined by the rotation rate of the constant-speed motor or the inertia of the rotary machine. Accordingly, there is a problem that the rotation rate of the variable-speed motor becomes larger than a rated rotation rate.

The present invention aims to provide a variable speed accelerator which includes: an electric driving device including a constant-speed motor and a variable-speed motor; and a planetary gear transmission device configured to change the speed of a rotational driving force generated by the electric driving device and then transmit the speed-changed rotational driving force to a driving target, the variable speed accelerator being capable of preventing over-rotation of the variable-speed motor even when an inverter breaks down.

Means to Solve the Problems

According to a first aspect of the present invention, there is provided a variable speed accelerator including: an electric driving device which is configured to generate a rotational driving force; and a transmission device which is configured to change the speed of the rotational driving force generated by the electric driving device and transmit the changed rotational driving force to a driving target, wherein the transmission device includes: a sun gear which is configured to rotate about an axis; a sun gear shaft which is fixed to the sun gear and extends in an axial direction around the axis; a planetary gear which is configured to mesh with the sun gear, revolve around the axis, and rotate about its own center line; an internal gear which has a plurality of teeth aligned annularly around the axis and is configured to mesh with the planetary gear; a planetary gear carrier which has a planetary gear carrier shaft extending in the axial direction around the axis and is configured to support the planetary gear to allow the planetary gear to revolve around the axis and to rotate about a center line of the planetary gear itself; and an internal gear carrier which has an internal gear carrier shaft extending in the axial direction around the axis and is configured to support the internal gear to allow the internal gear to be rotatable about the axis, wherein the sun gear shaft forms an output shaft connected to the driving target, the internal gear carrier shaft forms a constant-speed input shaft, and the planetary gear carrier shaft forms a variable-speed input shaft, the electric driving device includes: a constant-speed motor having a constant-speed rotor which is configured to rotate the constant-speed input shaft of the transmission device in a first direction; and a variable-speed motor having a variable-speed rotor which is connected to the variable-speed input shaft of the transmission device, forms a cylindrical shape centered on the axis with a shaft insertion hole passing therethrough in the axial direction through which the constant-speed input shaft is inserted, and is configured to rotate at a maximum rotation rate in a second direction opposite to the first direction to rotate the output shaft at a maximum rotation rate; and the variable speed accelerator further includes: an AC power source line which connects the variable-speed motor with an AC power source to rotate the variable-speed motor in the second direction; a rotation rate controller which is provided on the AC power source line and controls a rotation rate of the variable-speed motor; a first switch which is provided on the AC power source line; and a braking circuit which is connected to portions locating between the variable-speed motor and the rotation rate controller with the first switch on the AC power source line to brake the variable-speed motor.

According to such a constitution, when the rotation rate controller brakes down, the over-rotation of the variable-speed motor can be prevented by braking the variable-speed motor using the braking circuit.

In the variable speed accelerator, the braking circuit may be a DC braking circuit which applies a direct current to a terminal of the variable-speed motor.

According to such a constitution, it is possible to construct the braking circuit easily using a general-purpose emergency power source or the like.

Effects of the Invention

According to the present invention, it is possible to prevent the over-rotation of the variable-speed motor by braking the variable-speed motor using the braking circuit when the rotation rate controller breaks down.

EMBODIMENTS FOR CARRYING OUT THE INVENTION

Hereinafter, a variable speed accelerator according to an embodiment of the present invention will be described in detail with reference to the drawings.

Figure 1:
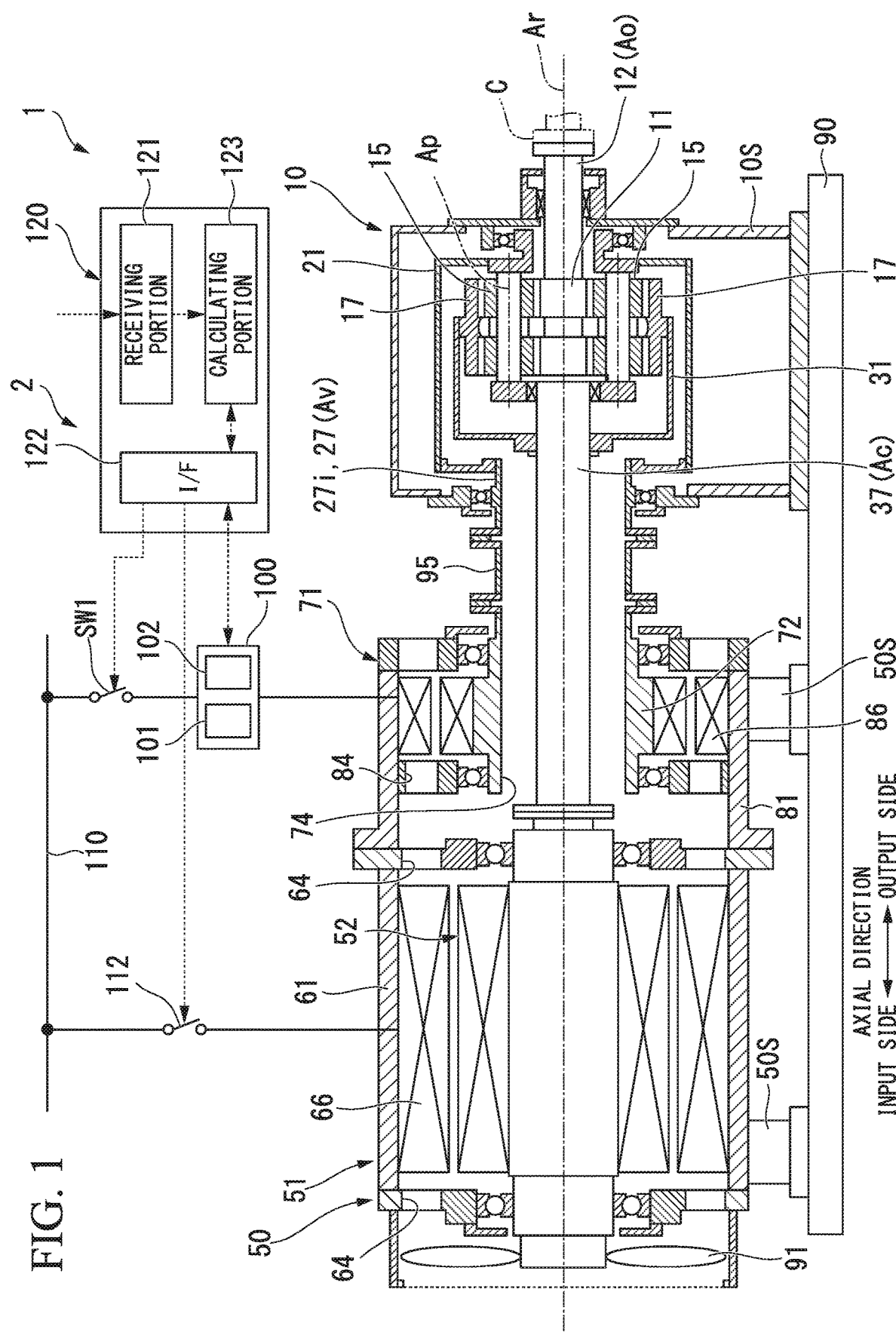
FIG. 1 is a cross-sectional view of a variable speed accelerator according to an embodiment of the present invention.

As shown in FIG. 1, the variable speed accelerator 1 of the embodiment includes: an electric driving device 50 which generates a rotational driving force; and a transmission device 10 which changes the speed of a rotational driving force generated by the electric driving device 50 and then transmits the speed-changed rotational driving force to a driving target. The variable speed accelerator 1 can be applied to, for example, a fluid mechanical system such as a compressor system.

The variable speed accelerator 1 of the embodiment includes a braking circuit 2 (refer to FIG. 5) which brakes a variable-speed motor 71 when a rotation rate controller 100 (inverter) of the variable-speed motor 71 constituting the electric driving device 50 breaks down.

Figure 2:
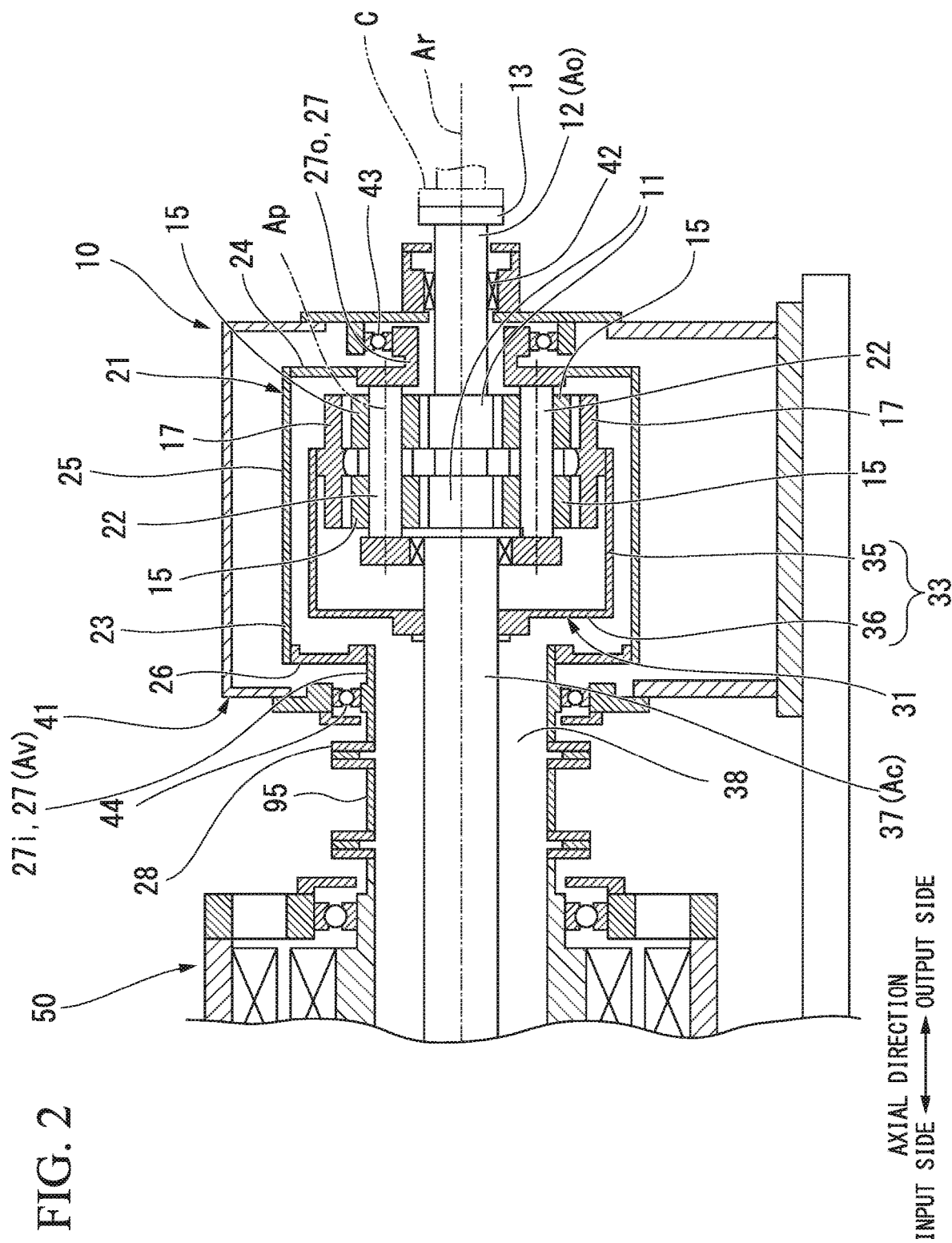
FIG. 2 is a cross-sectional view of a transmission device according to the embodiment of the present invention.

The transmission device 10 is a planetary gear transmission device. As shown in FIG. 2, the transmission device 10 includes: a sun gear 11 which rotates about an axis Ar extending in a horizontal direction; a sun gear shaft 12 fixed to the sun gear 11; a plurality of planetary gears 15 which mesh with the sun gear 11, revolve around the axis Ar and rotate about their own center lines Ap; an internal gear 17 in which a plurality of teeth are arranged in an annular shape around the axis Ar and which meshes with the plurality of planetary gears 15; a planetary gear carrier 21 which supports the plurality of planetary gears 15 to allow the plurality of planetary gears 15 to revolve around the axis Ar and to rotate about their own center lines Ap; an internal gear carrier 31 which supports the internal gear 17 to allow the internal gear 17 to rotate about the axis Ar; and a transmission casing 41 which covers these elements.

Hereinafter, a direction in which the axis Ar extends is defined as an axial direction, one side in the axial direction is defined as an output side, and a side opposite to the output side is defined as an input side. Also, a radial direction around the axis Ar is simply referred to as a radial direction.

The sun gear shaft 12 forms a circular column shape centered on the axis Ar and extends from the sun gear 11 toward the output side in the axial direction. A flange 13 is formed at an output-side end of the sun gear shaft 12. For example, a rotor of the compressor C which serves as a driving target is connected to the flange 13. The sun gear shaft 12 is supported to be rotatable about the axis Ar by a sun gear bearing 42 disposed on the output side of the sun gear 11. The sun gear bearing 42 is installed at the transmission casing 41.

The planetary gear carrier 21 includes: a planetary gear shaft 22 provided for each of the plurality of planetary gears 15; a carrier main body 23 which fixes the relative positions of the plurality of planetary gear shafts 22; and a planetary gear carrier shaft 27 which is fixed to the carrier main body 23 and extends in the axial direction centered on the axis Ar.

The planetary gear shaft 22 passes through the center lines Ap of the planetary gears 15 in the axial direction and supports the planetary gears 15 to allow the planetary gears 15 to rotate about a center line thereof. The carrier main body 23 includes: an output-side arm portion 24 extending outward in the radial direction from the plurality of planetary gear shafts 22; a cylindrical portion 25 which has a cylindrical shape centered on the axis Ar and extends from the radially outer end of the output-side arm portion 24 toward the input side; and an input-side a n portion 26 which extends inward in the radial direction from the output-side end of the cylindrical portion 25.

The planetary gear carrier shaft 27 includes: an output-side planetary gear carrier shaft 27o which extends from the output-side arm portion 24 toward the output side; and an input-side planetary gear carrier shaft 27i which extends from the input-side arm portion 26 toward the input side. Both of the output-side planetary gear carrier shaft 27o and the input-side planetary gear carrier shaft 27i form a cylindrical shape centered on the axis Ar.

The output-side planetary gear carrier shaft 27o is supported to be rotatable about the axis Ar by a planetary gear carrier bearing 43 disposed on the output side relative to the output-side arm portion 24. The planetary gear carrier bearing 43 is installed at the transmission casing 41. The sun gear shaft 12 is inserted through the inner circumferential side of the output-side planetary gear carrier shaft 27o.

The input-side planetary gear carrier shaft 27i is supported to be rotatable about the axis Ar by a planetary gear carrier bearing 44 disposed on the input side relative to the input-side arm portion 26. The planetary gear carrier bearing 44 is installed at the transmission casing 41. A flange 28 having an annular shape which expands outward in the radial direction is formed at the input-side end of the input-side planetary gear carrier shaft 27i.

The internal gear carrier 31 includes: a carrier main body 33 to which the internal gear 17 is fixed; and an internal gear carrier shaft 37 which is fixed to the carrier main body 33 and extends in the axial direction centered on the axis Ar.

The carrier main body 33 includes: a cylindrical portion 35 which has a cylindrical shape centered on the axis Ar and has the internal gear 17 fixed to the inner circumferential side thereof; and an input-side arm portion 36 which extends inward in the radial direction from the input-side end of the cylindrical portion 35.

The internal gear carrier shaft 37 having a column shape around the axis Ar is disposed on the input side of the sun gear shaft 12 having a column shape around the axis Ar. The input-side arm portion 36 of the carrier main body 33 is fixed to the internal gear carrier shaft 37. The input-side portion of the internal gear carrier shaft 37 is inserted through the inner circumferential side of the cylindrical input-side planetary gear carrier shaft 27i.

The electric driving device 50 includes: a constant-speed motor 51 which rotates the internal gear carrier shaft 37 at a constant speed; and a variable-speed motor 71 which rotates the input-side planetary gear carrier shaft 27i at an arbitrary rotation rate.

The internal gear carrier shaft 37 is a constant-speed input shaft Ac which rotates at a constant speed under a driving force of the constant-speed motor 51. The input-side planetary gear carrier shaft 27i is a variable-speed input shaft Av which rotates at an arbitrary rotation rate under a driving force of the variable-speed motor 71.

The variable speed accelerator 1 can change the rotation rate of an output shaft Ao of the transmission device 10 connected to the driving target by changing the rotation rate of the variable-speed motor 71.

The electric driving device 50 is supported on a frame 90 by an electric driving device support portion 50S. The transmission device 10 is supported on the frame 90 by a transmission device support portion 10S. The electric driving device 50 and the transmission device 10 which are heavy objects can be securely fixed by these support portions.

Figure 3:
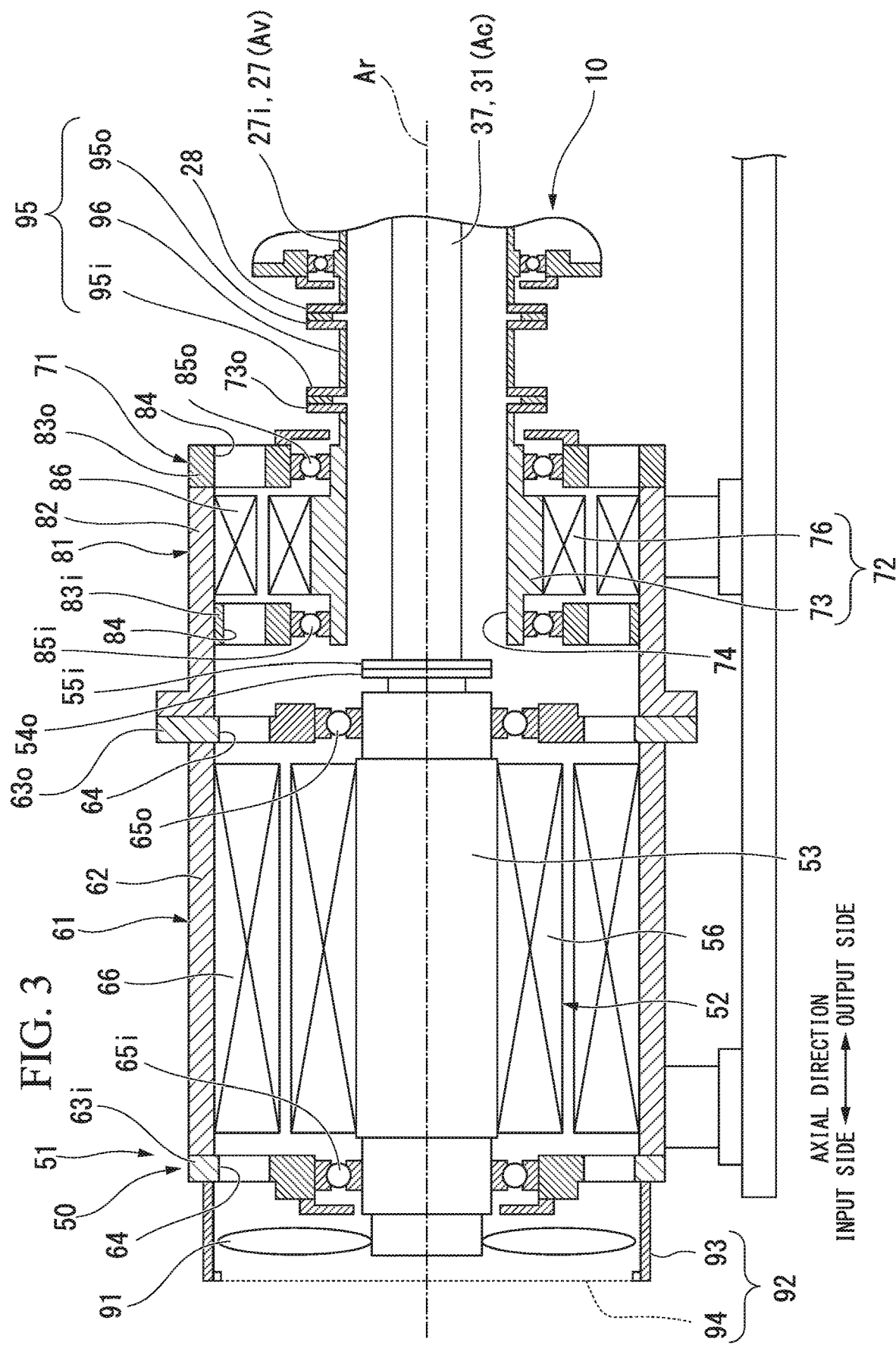
FIG. 3 is a cross-sectional view of an electric driving device according to an embodiment of the present invention.

As shown in FIG. 3, the constant-speed motor 51 rotationally drives the internal gear carrier shaft 37 of the transmission device 10. The variable-speed motor 71 rotationally drives the input-side planetary gear carrier shaft 27*i* of the transmission device 10. The electric driving device 50 includes: a cooling fan 91 which cools the constant-speed motor 51; and a fan cover 92 which covers the cooling fan 91.

In the embodiment, the constant-speed motor 51 is, for example, a four-pole three-phase induction motor. Further, the variable-speed motor 71 is a six-pole three-phase induction motor having more poles than the constant-speed motor 51. The specifications of the constant-speed motor 51 and the variable-speed motor 71 are not limited to these and can be appropriately changed.

The constant-speed motor 51 includes: a constant-speed rotor 52 which rotates about the axis Ar and is connected to the internal gear carrier shaft 37 which is the constant-speed input shaft Ac of the transmission device 10; a constant-speed stator 66 disposed on the outer circumferential side of the constant-speed rotor 52; and a constant-speed motor casing 61 in which the constant-speed stator 66 is fixed to the inner circumferential side thereof.

The constant-speed motor 51 rotationally drives the constant-speed rotor 52 (internal gear 17) in a first direction R1 (refer to FIG. 4, positive direction) of the circumferential direction of the axis Ar. As the constant-speed rotor 52 rotates in the first direction R1, the internal gear carrier shaft 37 and the internal gear carrier 31 rotate in the first direction R1.

The constant-speed rotor 52 includes: a constant-speed rotor shaft 53 which has a column shape around the axis Ar; and a conductive body 56 fixed to the outer circumference of the constant-speed rotor shaft 53. The cooling fan 91 is fixed to the input side end of the constant-speed rotor shaft 53.

The constant-speed stator 66 is disposed radially outward from the conductive body 56 of the constant-speed rotor 52. This constant-speed stator 66 is foil led of a plurality of coils.

The constant-speed motor casing 61 includes: a casing main body 62 having a cylindrical shape centered on the axis Ar and in which the constant-speed stator 66 is fixed to the inner circumferential side thereof; and covers 63*i* and 63*o* which close both axial ends of the cylindrical casing main body 62. Constant-speed rotor bearings 65*i* and 65*o* are installed at the respective covers 63*i* and 63*o* to rotatably support the constant-speed rotor shaft 53 about the axis Ar. A plurality of openings 64 axially passing through the respective covers 63*i* and 63*o* at positions radially outward from the constant-speed rotor bearing 65*i* are formed in the respective covers 63*i* and 63*o*.

The input-side end of the constant-speed rotor shaft 53 protrudes toward the input side from the input-side cover 63*i* of the constant-speed motor casing 61. The cooling fan 91 is fixed to the input-side end of the constant-speed rotor shaft 53.

When the constant-speed rotor 52 rotates, the cooling fan 91 also rotates integrally with the constant-speed rotor 52. The fan cover 92 includes: a cylindrical cover main body 93 disposed on the outer circumferential side of the cooling fan 91; and an air circulating plate 94 installed at an opening of the cover main body 93 on the inlet side and having a plurality of air holes formed therein. The fan cover 92 is fixed to the cover 63*i* of the constant-speed motor casing 61 on the input side.

The variable-speed motor 71 includes: a variable-speed rotor 72 which rotates about the axis Ar and is connected to the input-side planetary gear carrier shaft 27*i* which is the variable-speed input shaft Av; a variable-speed stator 86 disposed on the outer circumferential side of the variable-speed rotor 72; and a variable-speed motor casing 81 in which the variable-speed stator 86 is fixed to the inner circumferential side thereof.

The variable-speed motor 71 rotationally drives the variable-speed rotor 72 (planetary gear carrier 21) in the first direction R1 of the circumferential direction of the axis Ar and a second direction R2 (refer to FIG. 4) opposite to the first direction R1. That is, the variable-speed motor 71 can rotate forward and in reverse.

The variable-speed motor 71 serves as a generator by rotating the variable-speed rotor 72 in the first direction A state in which the variable-speed motor 71 serves as a generator is referred to as a generator mode. That is, the variable-speed rotor 72 of the variable-speed motor 71 rotates in the first direction R1 in the generator mode.

The variable-speed motor 71 serves as an electric motor by rotating the variable-speed rotor 72 in the second direction R2 opposite to the first direction R1. A state in which the variable-speed motor 71 serves as an electric motor is referred to as an electric motor mode. That is, the variable-speed rotor 72 of the variable-speed motor 71 rotates in the second direction R2 in the electric motor mode.

The planetary gear carrier shaft 27 and the planetary gear carrier 21 rotate in the first direction R1 by the rotation of the variable-speed rotor 72 in the first direction R1.

The variable-speed rotor 72 includes: a variable-speed rotor shaft 73; and a conductive body 76 fixed to the outer circumference of the variable-speed rotor shaft 73. The variable-speed rotor shaft 73 forms a cylindrical shape around the axis Ar and has a shaft insertion hole 74 passing through the variable-speed rotor shaft 73 in the axial direction. The internal gear carrier shaft 37 is inserted through the shaft insertion hole 74 of the variable-speed rotor shaft 73 as the constant-speed input shaft Ac. An annular flange 73*o* expanding radially outward is formed at the output-side end of the variable-speed rotor shaft 73.

The variable-speed stator 86 is disposed radially outward from the conductive body 76 of the variable-speed rotor 72. The variable-speed stator 86 is formed of a plurality of coils.

The variable-speed motor casing 81 includes: a casing main body 82 having a cylindrical shape around the axis Ar and to the inner circumferential side of which the variable-speed stator 86 is fixed; an output-side cover 83*o* which closes the output-side end of the cylindrical casing main body 82; and an inlet-side cover 83*i* disposed on the input side relative to the variable-speed stator 86 and fixed to the inner circumferential side of the cylindrical casing main body 82. Variable-speed rotor bearings 85*i* and 85*o* which rotatably support the variable-speed rotor shaft 73 about the axis Ar are installed at the respective covers 83*i* and 83*o*. In the respective covers 83i and 83o, a plurality of openings 84 passing through the respective covers 83i and 83o in the axial direction are formed at positions radially outward from the variable-speed rotor bearings 85i and 85o.

A space in the variable-speed motor casing 81 and a space in the constant-speed motor casing 61 communicate with each other through the plurality of openings 84 formed in the respective covers 83i and 83o of the variable-speed motor casing 81 and the plurality of openings 64 formed in the respective covers 63i and 63o of the constant-speed motor casing 61.

Further, in the variable speed accelerator 1 of the embodiment, the constant-speed rotor 52, the variable-speed rotor 72 and the sun gear shaft 12 are arranged on the same axis.

The variable speed accelerator 1 of the embodiment includes: the rotation rate controller 100 which controls the rotation rate of the variable-speed motor 71; a first switch SW1 which sets the variable-speed motor 71 to be in a power supply state or a power cutoff state; a constant-speed motor switch 112 which sets the constant-speed motor 51 to be in the power supply state or the power cutoff state; and a controller 120 which controls operations of the rotation rate controller 100, the first switch SW1 and the constant-speed motor switch 112.

The controller 120 is constituted of a computer. The controller 120 includes: a receiving portion 121 which directly receives an instruction from an operator or receives an instruction from a host control device; an interface 122 which provides instructions to the first switch SW1, the rotation rate controller 100 and the constant-speed motor switch 112; and a calculating portion 123 which creates instructions for the first switch SW1, the constant-speed motor switch 112, and the rotation rate controller 100 according to the instructions received by the receiving portion 121 or the like.

The first switch SW1 is electrically connected to a power source line 110 and the rotation rate controller 100. The rotation rate controller 100 is electrically connected to the variable-speed motor 71. The constant-speed motor switch 112 is electrically connected to the power source line 110 and the constant-speed motor 51.

The first switch SW1 is turned on by an on instruction from the controller 120 and turned off by an off instruction from the controller 120. When the first switch SW1 is turned on, electric power from the power source line 110 is supplied to the variable-speed motor 71 through the rotation rate controller 100, and the variable-speed motor 71 is in the power supply state. When the first switch SW1 is turned off, the power supply from the power source line 110 to the rotation rate controller 100 and the variable-speed motor 71 is cut off, and the variable-speed motor 71 is in the power cutoff state.

The constant-speed motor switch 112 is turned on by an on instruction from the controller 120 and turned off by an off instruction from the controller 120. When the constant-speed motor switch 112 is turned on, the electric power from the power source line 110 is supplied to the constant-speed motor 51, and the constant-speed motor 51 is in the power supply state. When the constant-speed motor switch 112 is turned off, the power supply from the power source line 110 to the constant-speed motor 51 is cut off, and the constant-speed motor 51 is in the power cutoff state.

The rotation rate controller 100 includes: a frequency conversion portion 101 which changes a frequency of the electric power supplied from the power source line 110; and a rotation direction switching portion 102 which changes a rotation direction of the variable-speed motor 71.

The frequency conversion portion 101 supplies the electric power having a frequency instructed by the controller 120 to the variable-speed motor 71. The variable-speed rotor 72 of the variable-speed motor 71 rotates at a rotation rate corresponding to this frequency. Since the rotation rate of the variable-speed rotor 72 changes in this manner, the rotation rate of the planetary gear carrier 21 of the transmission device 10 connected to the variable-speed rotor 72 also changes. As a result, the rotation rate of the sun gear shaft 12 which is the output shaft Ao of the transmission device 10 also changes.

The rotation direction switching portion 102 is a device which changes the rotation direction of the variable-speed motor 71 by using a circuit configured to switch a plurality of (three in the case of the embodiment) power source lines connected to the variable-speed motor 71. That is, the rotation direction switching portion 102 can rotate the variable-speed rotor 72 forward and in reverse.

Figure 4:
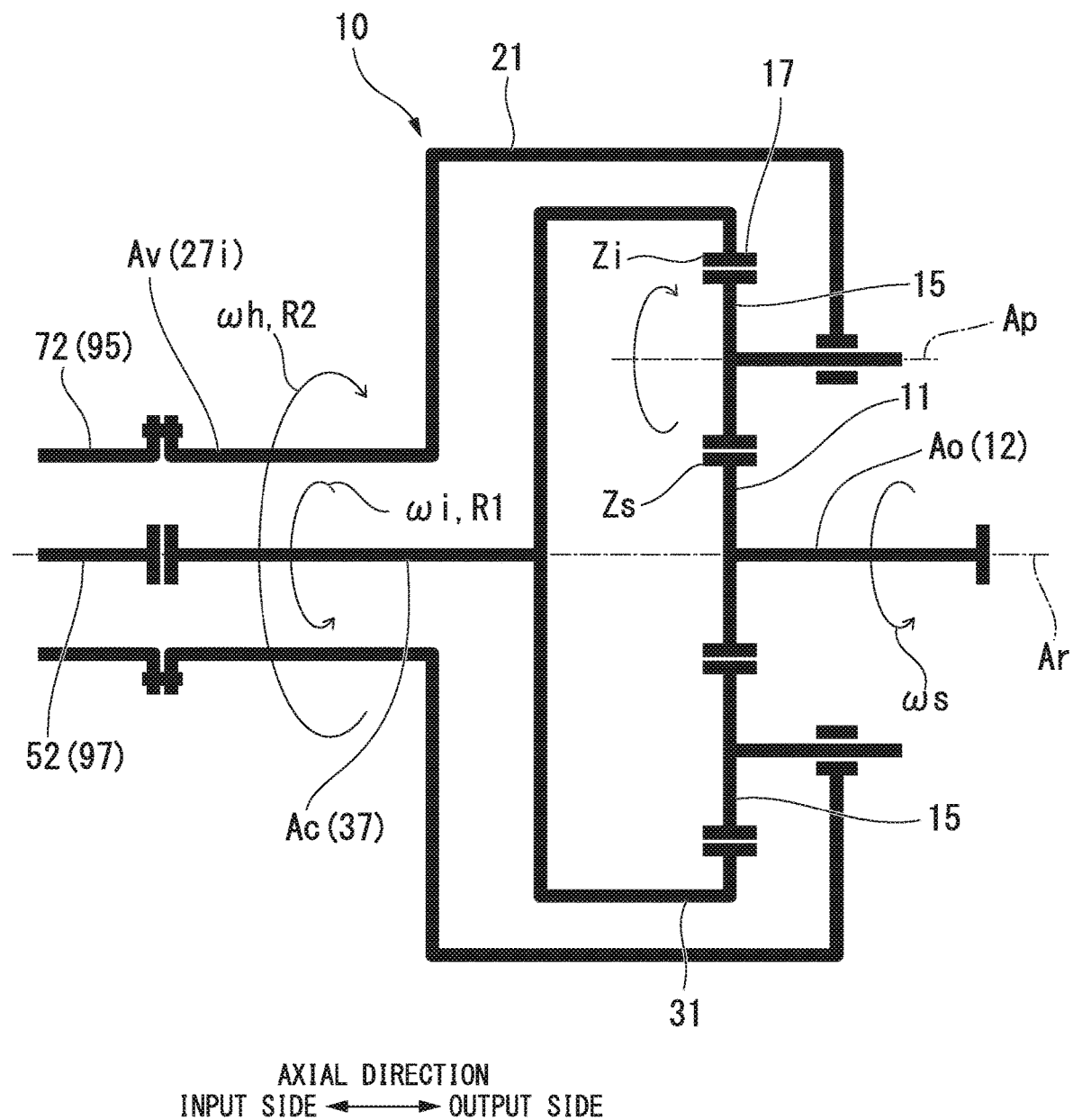
FIG. 4 is a schematic diagram showing a constitution of the transmission device according to the embodiment of the present invention.

Here, the relationship between the number of teeth of each gear of the transmission device 10 and the rotation rate of each shaft of the transmission device 10 will be described with reference to FIG. 4.

The rotation rate of the sun gear shaft 12 that is the output shaft Ao is indicated by ωs, the rotation rate of the internal gear carrier shaft 37 that is the constant-speed input shaft Ac is indicated by ωi, and the rotation rate of the input-side planetary gear carrier shaft 27i that is the variable-speed input shaft Av is indicated by ωh. Further, the number of teeth of the sun gear 11 is indicated by Zs, and the number of teeth of the internal gear 17 is indicated by Zi.

In this case, the relationship between the number of teeth of each gear and the rotation rate of each shaft in the transmission device 10 can be expressed by the following Formula (1):

$$\omega s/\omega i = \omega h/\omega i - (1 - h/\omega i) \times Zi/Zs \quad (1)$$

When the constant-speed motor 51 is a four-pole induction motor and the power source frequency is 50 Hz, the rotation rate ωi (rated rotation rate) of the constant-speed rotor 52 (constant-speed input shaft Ac) is 1,500 rpm. Further, when the variable-speed motor 71 is a six-pole induction motor and the power supply frequency is 50 Hz, the maximum rotation rate ωh (rated rotation rate) of the variable-speed rotor 72 (variable-speed input shaft Av) is 900 rpm. Furthermore, it is assumed that a ratio Zi/Zs between the number of teeth Zs of the sun gear 11 and the number of teeth Zi of the internal gear 17 is 4.

In this case, when the rotation direction of the constant-speed rotor 52 (internal gear 17) is the forward rotation (rotation in the first direction) and the rotation direction of the variable-speed rotor 72 (planetary gear carrier 21) is a direction opposite to the rotation of the constant-speed rotor 52 (rotation in the second direction) and has the maximum rotation rate (−900 rpm), the rotation rate ωs of the sun gear shaft 12 which is the output shaft Ao is −10,500 rpm. This rotation rate (−10,500 rpm) is the maximum rotation rate of the sun gear shaft 12.

That is, in the transmission device 10 of the embodiment, the rotation rate ωs of the output shaft Ao becomes the maximum rotation rate when the internal gear 17 rotates in accordance with the constant-speed input shaft Ac at +1500 rpm in the forward direction and the planetary gear carrier 21 rotates in accordance with the variable-speed input shaft Av at −900 rpm in the reverse direction.

Assuming that a variable-speed range of the variable-speed input shaft Av is from −900 rpm to +900 rpm, the rotation rate cos of the output shaft Ao lowers as the rotation rate of the variable-speed input shaft Av approaches +900 rpm.

When the rotation direction of the constant-speed rotor 52 is the forward rotation and the rotation direction of the variable-speed rotor 72 is the direction opposite to the rotation direction of the constant-speed rotor 52 and has the minimum rotation rate (−90 rpm), the rotation rate of the sun gear shaft 12 is −6450 rpm.

When the rotation rate (rated rotation rate) of the constant-speed rotor 52 is +1500 rpm and the rotation rate of the variable-speed rotor 72 in the electric motor mode is controlled within a range of −300 to −900 rpm by frequency control by the frequency conversion portion 101, in other words, when the frequency of the electric power supplied to the variable-speed motor 71 is controlled within a range of 16.7 Hz to 50 Hz, the rotation rate of the sun gear shaft 12 which is the output shaft Ao can be controlled within a range of −7500 to −10,500 rpm. This range is a variable speed range of the sun gear shaft 12 which is the output shaft Ao of the variable speed accelerator 1, and the variable speed accelerator 1 normally rotates the output shaft Ao within this variable speed range.

Next, the braking circuit 2 of the variable speed accelerator 1 of the embodiment will be described. The braking circuit 2 is a circuit configured to prevent over-rotation of the variable-speed motor 71 when the rotation rate controller 100 configured to control the rotation rate of the variable-speed motor 71 breaks down.

Figure 5:
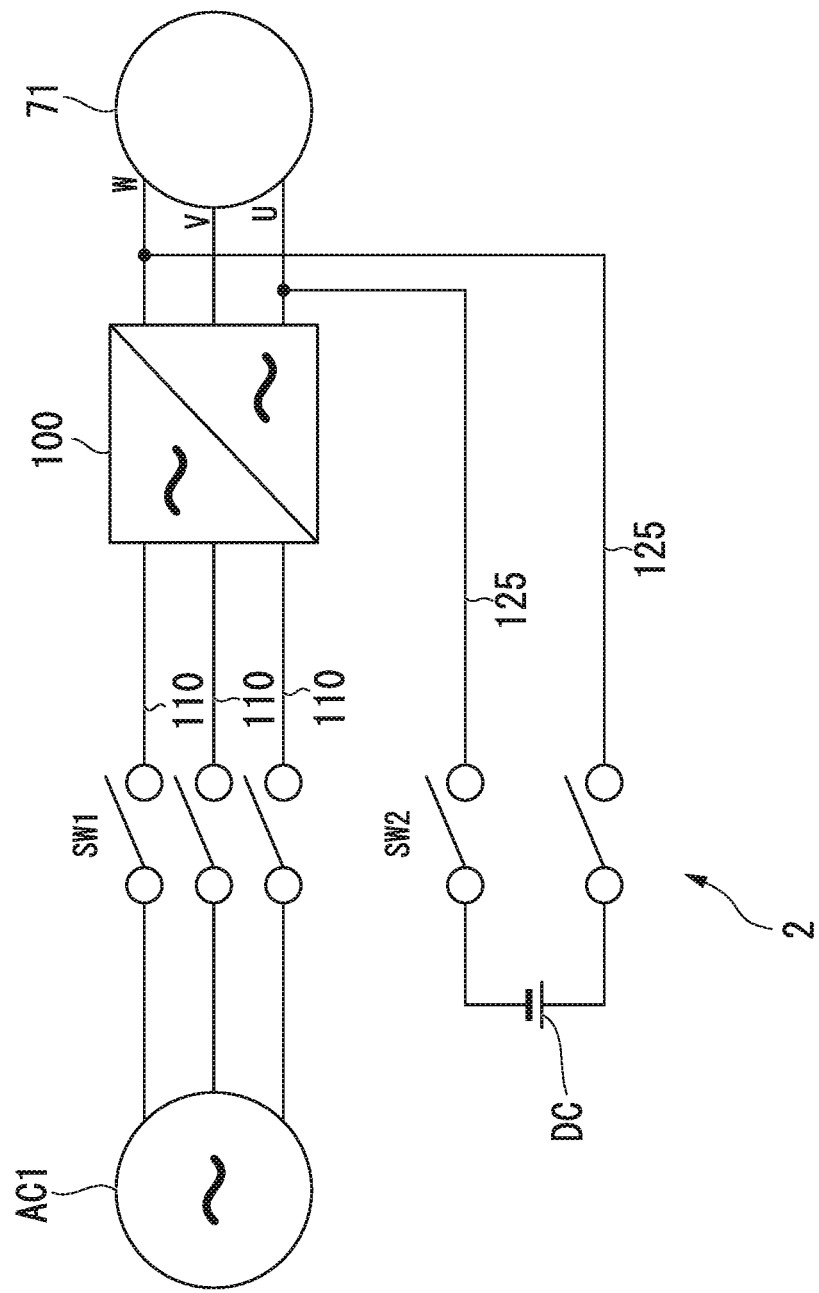
FIG. 5 is a system diagram of a braking circuit of the variable speed accelerator according to the embodiment of the present invention.

FIG. 5 is a system diagram showing the braking circuit 2 of the variable speed accelerator 1 of the embodiment. As shown in FIG. 5, the variable speed accelerator 1 of the embodiment includes: an AC power source line 110 which connects the first AC power source AC1, which is an AC power source, with the variable-speed motor 71; a rotation rate controller 100 which converts a frequency of the AC power source; and the braking circuit 2. The first switch SW1 which sets the variable-speed motor 71 in the power supply state or the power cutoff state is provided on the AC power source line 110.

As described above, the variable-speed motor 71 is a three-phase induction motor. The variable-speed motor 71 has three terminals: a U terminal, a V terminal and a W terminal.

The braking circuit 2 is a DC braking circuit including: a DC power source DC; and two DC power source lines 125 which connect the DC power source DC with the AC power source line 110. The DC power source DC may be equipped with an emergency power source, a battery, or the like.

One of the DC power source lines 125 is connected to one of the three AC power source lines 110. The other one of the DC power source lines 125 is connected to one of the three AC power source lines 110 which is not connected to the one of the DC power source lines 125. The DC power source lines 125 are connected to the AC power source lines 110 between the rotation rate controller 100 and the variable-speed motor 71.

That is, the braking circuit 2 of the embodiment can apply a direct current to any two terminals among the three terminals of the variable-speed motor 71.

Next, an emergency stopping method (control method) of the variable speed accelerator 1 of the embodiment will be described.

Figure 6:
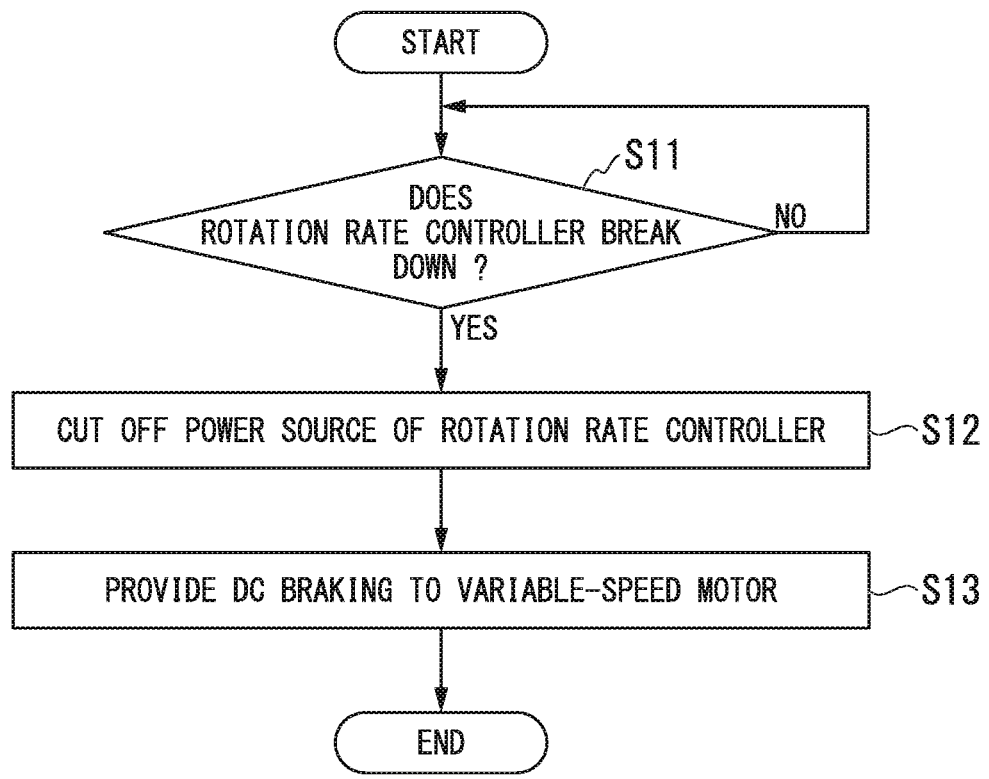
FIG. 6 is a flowchart showing an operation of a control device according to the embodiment of the present invention.

As shown in FIG. 6, the emergency stopping method of the variable speed accelerator 1 of the embodiment includes: a failure detection step S11 in which a failure of the rotation rate controller 100 is detected; a power cutoff step S12 in which the power source line 110 is cut off when a failure of the rotation rate controller 100 is detected; and a braking step S13 in which a constant-speed motor switch SW2 is closed and DC braking is applied to the variable-speed motor 71.

During a normal operation of the variable speed accelerator 1, the first switch SW1 is in a connected state, and the electric power is supplied to the variable-speed motor 71. During the normal operation of the variable speed accelerator 1, the constant-speed motor switch SW2 is disconnected, and the DC power source DC and the AC power source line 110 are not connected.

When a control device (not shown) of the variable speed accelerator 1 detects a failure of the rotation rate controller 100 in the failure detection step S11, the control device opens the first switch SW1 to cut off the electric power to be supplied to the variable-speed motor 71 in the power-off step S12.

In the braking step S13, the control device sets the constant-speed motor switch SW2 to be in the connected state to supply a DC voltage to the variable-speed motor 71. Therefore, the DC braking is applied to the variable-speed motor 71.

According to the embodiment, when the rotation rate controller 100 breaks down, over-rotation of the variable-speed motor 71 can be prevented by braking the variable-speed motor 71 using the braking circuit 2.

Further, the braking circuit can be easily constructed using a general-purpose emergency power source or the like by using a DC braking circuit as the braking circuit 2.

In addition, in the embodiment, the internal gear carrier shaft 37 which is a rod-shaped shaft is inserted through the variable-speed rotor shaft 73 which is a cylindrical shaft formed with the shaft insertion hole 74. That is, the constant-speed input shaft Ac having a large output is inserted through the variable-speed rotor shaft 73 of the variable-speed motor 71 having a smaller output than the constant-speed motor 51. Thus, one having a larger output (horsepower) can be adopted as the constant-speed motor 51.

Further, in the embodiment, the whole apparatus can be made more compact by arranging the constant-speed motor 51, the variable-speed motor 71, the transmission device and the compressor C linearly in that order.

Further, in the embodiment, a four-pole three-phase induction motor is exemplified as the constant-speed motor 51 suitable to rotate the compressor C at a high speed, and a six-pole three-phase induction motor is exemplified as the variable-speed motor 71 suitable to vary the rotation rate of the compressor C within a certain range. However, when it is unnecessary to rotate the driving target at a high speed, other types of electric motors may be used as the constant-speed motor 51 or the variable-speed motor 71.

DESCRIPTION OF REFERENCE NUMERALS

1 Variable speed accelerator
2 Braking circuit
10 Transmission device
11 Sun gear
12 Sun gear shaft
15 Planetary gear
17 Internal gear
21 Planetary gear carrier
22 Planetary gear shaft
27 Planetary gear carrier shaft
27i Input-side planetary gear carrier shaft
27o Output-side planetary gear carrier shaft 37 Internal gear carrier shaft
41 Transmission casing
50 Electric driving device
51 Constant-speed motor
52 Constant-speed rotor
53 Constant-speed rotor shaft
56 Conductive body
61 Constant-speed motor casing
66 Constant-speed stator
71 Variable-speed motor
72 Variable-speed rotor
73 Variable-speed rotor shaft
74 Shaft insertion hole
76 Conductive body
81 Variable-speed motor casing
86 Variable-speed stator
100 Rotation rate controller
101 Frequency conversion portion
102 Rotation direction switching portion
110 AC power source line
112 Constant-speed motor switch
120 Controller
121 Receiving portion
122 Interface
123 Calculating portion
125 DC power source line
Ac Constant-speed input shaft
Ao Output shaft
Ar Axis
Av Variable-speed input shaft
C Compressor
R1 First direction
R2 Second direction
SW1 First switch

The invention claimed is:

1. A variable speed accelerator comprising:
an electric driving device configured to generate a rotational driving force; and
a transmission device configured to change a speed of the rotational driving force generated by the electric driving device and transmit the changed rotational driving force to a driving target,
wherein the transmission device comprises:
  a sun gear which is configured to rotate about an axis;
  a sun gear shaft which is fixed to the sun gear and extends in an axial direction around the axis;
  a planetary gear which is configured to mesh with the sun gear, revolve around the axis and rotate about a center line of the planetary gear;
  an internal gear which has a plurality of teeth aligned annularly around the axis and is configured to mesh with the planetary gear;
  a planetary gear carrier which has a planetary gear carrier shaft extending in the axial direction around the axis and is configured to support the planetary gear to allow the planetary gear to revolve around the axis and to rotate about a center line of the planetary gear; and
  an internal gear carrier which has an internal gear carrier shaft extending in the axial direction around the axis and is configured to support the internal gear to allow the internal gear to be rotatable about the axis,
wherein the sun gear shaft forms an output shaft connected to the driving target, the internal gear carrier shaft forms a constant-speed input shaft, and the planetary gear carrier shaft forms a variable-speed input shaft, and
the electric driving device comprises:
  a constant-speed motor comprising a constant-speed rotor which is configured to rotate the constant-speed input shaft of the transmission device in a first direction; and
  a variable-speed motor comprising a variable-speed rotor which is connected to the variable-speed input shaft of the transmission device, forms a cylindrical shape centered on the axis with a shaft insertion hole passing therethrough in the axial direction through which the constant-speed input shaft is inserted, and is configured to rotate at a maximum rotation rate in a second direction opposite to the first direction to rotate the output shaft at a maximum rotation rate, and
the variable speed accelerator further comprises:
  an AC power source line which connects the variable-speed motor with an AC power source to rotate the variable-speed motor in the second direction;
  a rotation rate controller which is provided on the AC power source line and is configured to control a rotation rate of the variable-speed motor;
  a first switch which is provided on the AC power source line; and
  a braking circuit which is connected to portions locating between the variable-speed motor and the rotation rate controller with the first switch on the AC power source line to brake the variable-speed motor.

2. The variable speed accelerator according to claim 1, wherein the braking circuit is a DC braking circuit which is configured to apply a direct current to a terminal of the variable-speed motor.

* * * * *